(No Model.) 2 Sheets—Sheet 1.

W. F. OLIN & F. J. CODDINGTON.
WHEEL.

No. 344,852. Patented July 6, 1886.

Witnesses:
O. W. Bond
Albert H. Adams

Inventor:
William F. Olin
Frank J. Coddington (No Model.) 2 Sheets—Sheet 2.
W. F. OLIN & F. J. CODDINGTON.
WHEEL.
No. 344,852. Patented July 6, 1886.
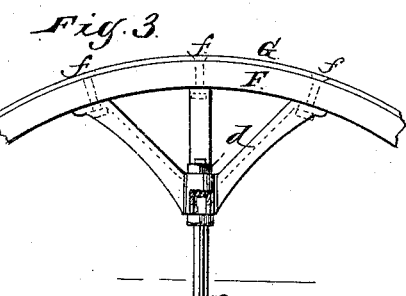
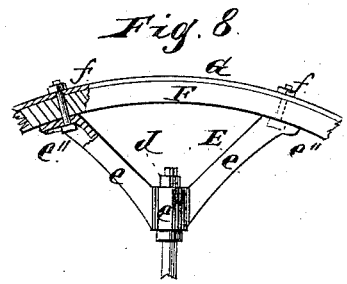
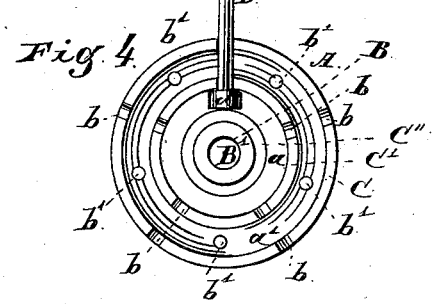
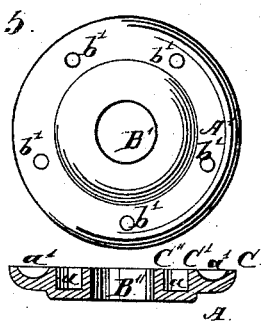
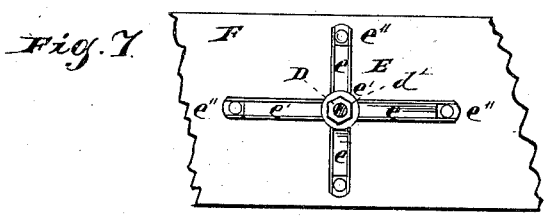
Witnesses:
O. W. Bond
Albert H. Adams
Inventor:
William F. Olin
Frank J. Coddington

United States Patent Office.

WILLIAM F. OLIN AND FRANK J. CODDINGTON, OF CHICAGO, ILLINOIS; SAID OLIN ASSIGNOR OF HIS RIGHT TO WILLIAM DEERING & COMPANY, OF SAME PLACE.

WHEEL.

SPECIFICATION forming part of Letters Patent No. 344,852, dated July 6, 1886.

Application filed June 2, 1884. Serial No. 133,649. (No model.)

*To all whom it may concern:*

Be it known that we, WILLIAM F. OLIN and FRANK J. CODDINGTON, residing at Chicago, in the county of Cook and State of Illinois, and citizens of the United States, have invented a new and useful Improvement in Wheels, of which the following is a full description, reference being had to the accompanying drawings, in which—

Figure 1:
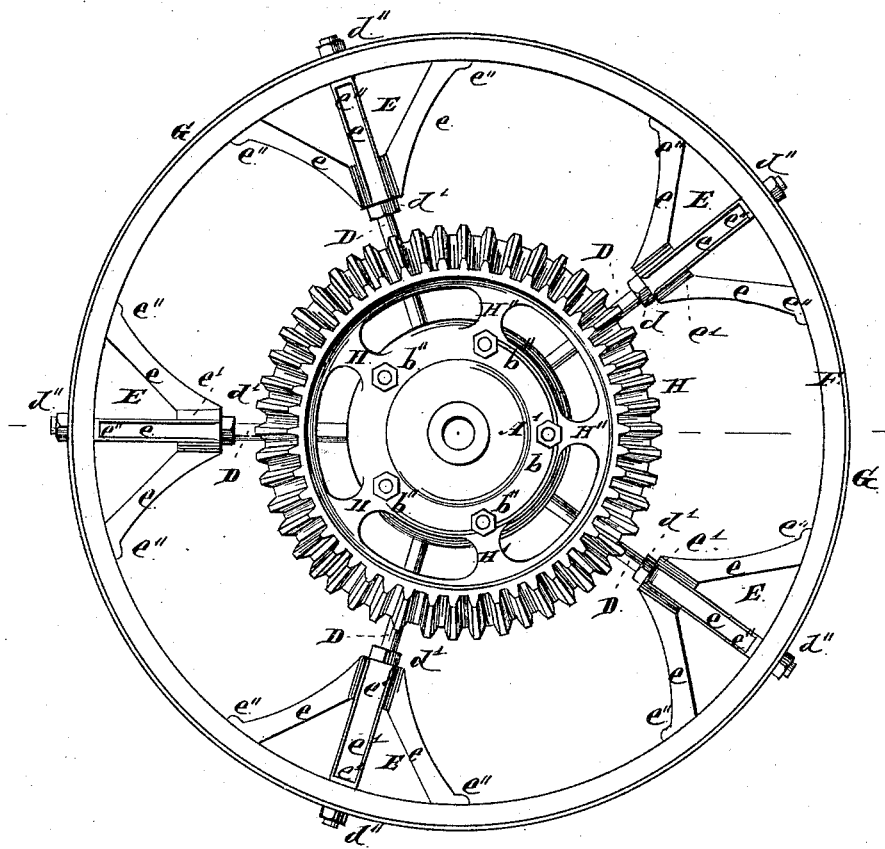
Figure 2:
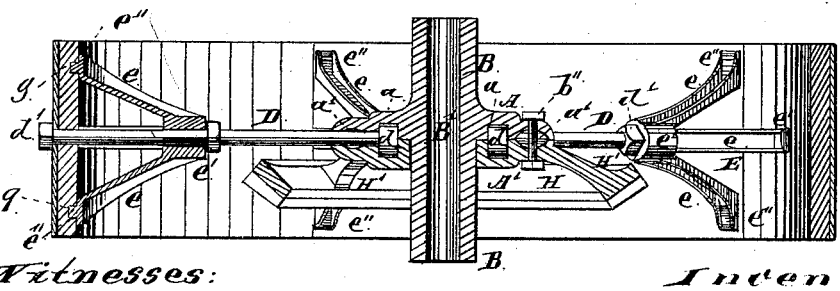

Figure 1 is a side elevation; Fig. 2, a section on line $xx$ of Fig. 1; Fig. 3, a detail showing one section of the hub and the manner of inserting the hub end of the spoke therein and of connecting the spoke with the rim or fellies; Fig. 4, a detail, being an inner face view of one section of the hub; Fig. 5, an outer face view of the other section of the hub; Fig. 6, a cross-section through the plate or hub section shown in Fig. 5; Fig. 7, a detail showing one form of the brace-connection with the rim or felly; Fig. 8, a detail showing a modification in the brace-connection for the rim or felly.

This invention is primarily designed for traction-wheels, or wheels running on the ground and imparting movement to other wheels or machinery, but it can be used for other forms of wheels which run on the ground, and has for its objects to produce a wheel which will resist the torsion and strain in use, both as against the resistance of the ground and the resistance of the parts which the wheel is intended to drive, and at the same time to so construct the wheel that the parts composing the same can be readily taken apart for the purpose of repairs; or the connection between the hub and the rim or felly can be properly adjusted to produce the required amount of strain on the rim or felly portion and the tire when used.

The invention consists in the novel construction and combination of devices hereinafter described and claimed.

In the drawings, A represents a plate, made of malleable iron or other suitable material, and of a round or circular form, as shown in Fig. 4. This plate on its interior face is provided with a groove, $a$, concentric with the center of the plate, and, as shown, is also provided with a shallow groove, $a'$, near its periphery.

A' is a second plate corresponding in diameter to that of the plate A, and also provided with grooves $a$ $a'$, which, when the two plates are together, coincide with the grooves $a$ $a'$ of the plate A.

B is a tube, cast or formed with the plate A, and projecting on both sides of such plate, and having a central circular opening, B', for the axle-spindle.

C is a flange or rim around the periphery of the plates A A'.

C' is a second flange or rim concentric with the flange or rim C, forming between them the shallow groove $a'$; and C'' is a third flange or rim concentric with the other, so as to form between it and the flange or rim C' the groove $a$, as shown in Figs. 2 and 6. The flanges C and C' are provided with half-round openings on each plate, so as to form, when the parts are together, round openings $b$, which openings stand radially from the center of the plates, as shown in Fig. 3, and, as shown, the plates A and A' are provided with holes $b'$, through which bolts $b''$ can be passed to secure the two plates firmly together.

D represents round rods of wrought-iron or other suitable material, each rod having at one end a head, $d$, which heads, when the rods D and plates A A' are together, lie within the groove $a$, as shown in Figs. 2 and 3. The other ends of the rods D are screw-threaded to receive a nut, $d'$, as shown in Figs. 1 and 2.

E represents connecting or bracing supports, one for each rod D, and of sufficient length to connect the rods with the rim or felly. These supports E, as shown in Figs. 1, 2, and 3, consist of four arms, $e$, radiating out from a center or socket, $e'$, which socket is provided with a central opening for the passage of the rod D, and, as shown, the extreme end of each arm $e$ is turned at an angle to form a foot or rest, $e''$, which lies, when the parts are together, in contact with the rim or felly.

As shown in Fig. 8, the bracing-support consists of two arms, $e$, radiating out from a center or socket, $e'$, having on each arm a foot, $e''$, and these bracing-supports might each consist of three radiating arms extending out in a like manner from a center or socket.

As shown in Fig. 2, the rods D pass entirely through the socket of the brace E, to and through the rim or felly, and, as shown in Figs. 3, 7, and 8, the rods D terminate after passing through the center or socket $e'$, and, as shown in Figs. 1 and 2, the end of each spoke is screw-threaded to receive a nut, $d'$, which nuts come outside of the tire, and, as shown in Figs. 3, 7, and 8, the ends of the rods D receive a nut, $d'$, which comes against the end face of the socket $e'$.

F is the rim or felly, made of wood or other suitable material.

G is the tire.

H is a beveled gear for use when the wheel is to be used as a traction driving-wheel, which gear, as shown, is cast or formed with the plate $A'$, being connected to the plate by arms $H'$; but this gear H might be made separate and secured to the rods D by clips or otherwise.

The wheel is put together as follows: The rods D, when of sufficient length to extend through the rim or felly, are slipped through the socket $e'$ of their respective brace-supports E, and through the rim or felly. Their inner ends, $d$, are then inserted in the groove $a$ of the plate A, with their body lying in the radial half-openings $b$, as shown in Fig. 3. The plate $A'$ is then slipped into position to have its openings $b'$ fit over the rods D, bringing the two plates A A' together, as shown in Fig. 2, with the plate $A'$ encircling the tube B, this plate having an opening, $B''$, for this purpose. The bolts $b''$ are then passed through the holes $b'$ in the plates A A' and the plates clamped firmly together by the nuts on the bolts $b''$. The jam-nut $d'$ is then turned up to engage the inner end of the socket of the brace-supports E, and force such supports outward to bring the feet $e''$ of the arms $e$ in firm contact with the inner face of the rim or felly, and, if desired, the connection between the felly and the brace-supports can be further strengthened by means of bolts $f$, as shown in Figs. 3 and 8, such bolts passing through the feet $e''$ and the rim or felly and the tire. The nuts $d''$ on the outer ends of the rods D are then screwed down, drawing the several parts firmly together.

As shown in Figs. 3 and 8, bolts are used to attach the feet of the brace-supports to the rim or felly; but instead of using bolts for this purpose the exterior face of each foot $e''$ could have cast thereon or formed therewith a lug, $g$, as shown in Fig. 2, which lugs enter corresponding mortises or openings formed on the inner face of the rim or felly. With short rods which do not extend through the felly or rim, the ends of the rods are simply passed through the socket $e$ of their respective brace-supports E, and their inner ends $d$ inserted in the groove $a$, as already described, and the supports forced out by the set-nuts $d'$ to engage the rim or felly, and the parts locked against end movement by the set-nut $d''$ engaging the outer end of the sockets $e'$.

The wheel, when used as a traction-wheel, can have the rods D run from the hub through the rim and tire, with the nut $d''$ on the outside of the tire, as such nuts will take the place of lugs to prevent slipping of the wheel in use; but when used as a carrying-wheel the rods D can terminate at the sockets $e$, if so desired, and for a traction-wheel these rods can also terminate at the sockets, and lugs be cast or formed on the tire to prevent slipping. The rods D, being locked by the heads $d$ in the groove $a$, end movement is prevented, and these rods, being also clamped within the holes $b$, are held firmly in place, and they are held against side pressure by the brace-supports E, the arms of which supports brace against each other, so that the strain in one direction will be counteracted by the resistance of the opposite brace, and where the wheel is used as a traction-wheel, in which case there is a pressure against the resistance of the ground, and also a pressure against the resistance of the driven parts, which pressures are on opposite sides of the wheel, both pressures will be counteracted by the brace-supports, as the supports brace each other and also brace the rods D irrespective of the direction of the pressure.

As shown, the wheel is organized for five rods and five brace-supports; but the number of brace-supports and rods can be varied to suit the diameter of the wheel and the purpose for which the wheel is to be used.

What we claim as new, and desire to secure by Letters Patent, is—

1. The combination of the plates A and $A'$, one having the attached tube B, and each constructed on its inner face with annular flanges C C' C'' and the concentric recess $a$, the flanges C C' of each plate having coincident radial recesses $b\ b$, the spokes D, having heads $d$ resting against the inner flange, C'', and the transverse bolts $b''$, passing through the plates between the outer flanges, C C', to clamp the plates together, with all the annular flanges in contact, substantially as shown and described.

2. The combination of the plates A A', the former being integral with tube B, each plate constructed on its inner face with the three annular flanges C C' C'' and the concentric recess $a$, and the two outer flanges, C C', of each plate having coincident radial recesses $b\ b$, and the spokes D, having heads $d$ bearing against the inner flange, C'', said plates being clamped directly one upon the other, with all the flanges in contact, substantially as described.

3. The plates A A', constructed as described, and rods D, having heads $d$, in combination with brace-supports E, substantially as and for the purpose specified.

4. The plates A A', constructed as described, and rods D, having heads $d$, in combination with the brace-supports E, and the rim or felly F, substantially as and for the purpose specified.

5. The plates A A', constructed as described, in combination with the rods D, having heads $d$, nuts $d'$, brace-supports E, and rim or felly F, substantially as and for the purposes specified.

WILLIAM F. OLIN.
FRANK J. CODDINGTON.

Witnesses:
ALBERT H. ADAMS,
O. W. BOND.